W. W. KELLY.
NUT BLANCHING MACHINE.
APPLICATION FILED SEPT. 3, 1914.
1,190,556.
Patented July 11, 1916.
5 SHEETS—SHEET 1.
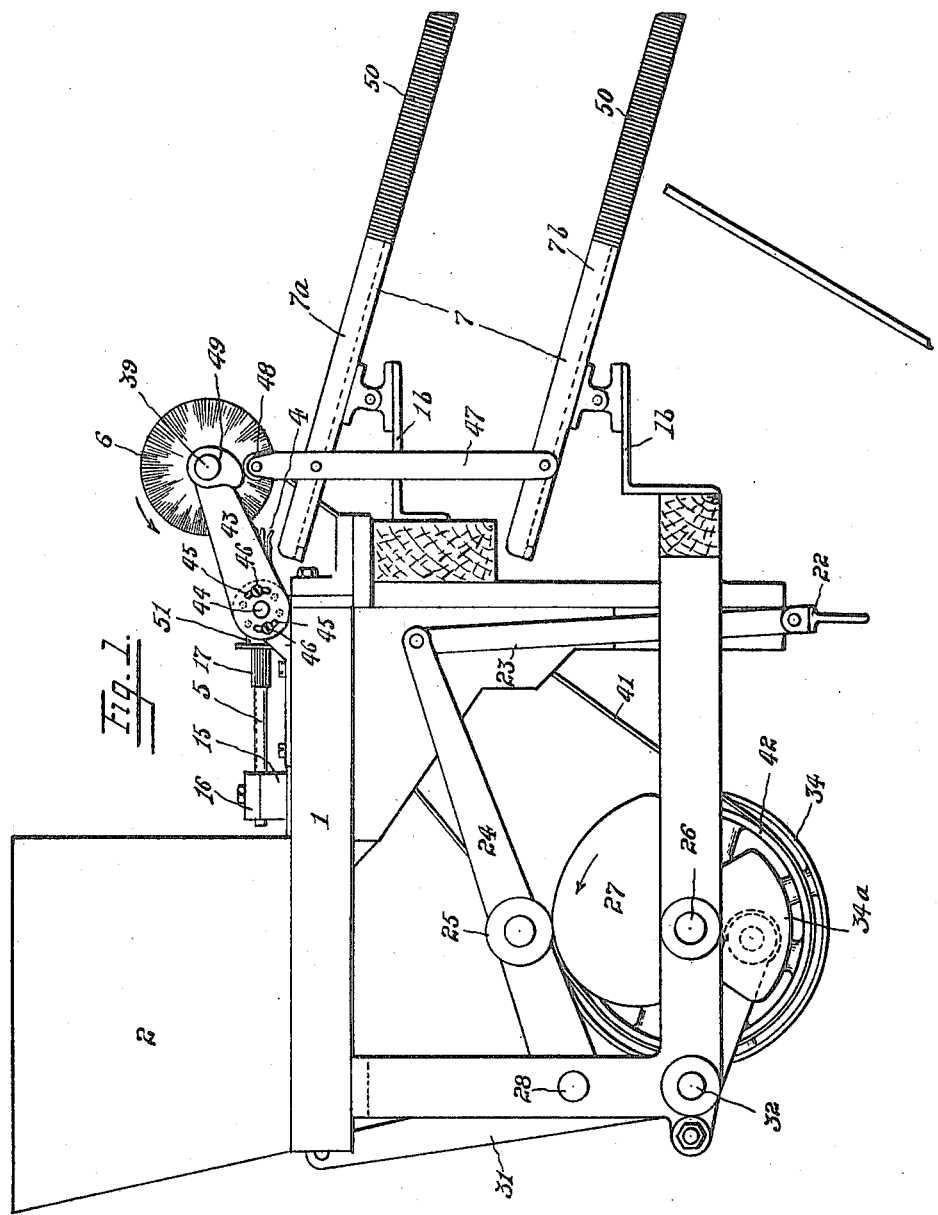

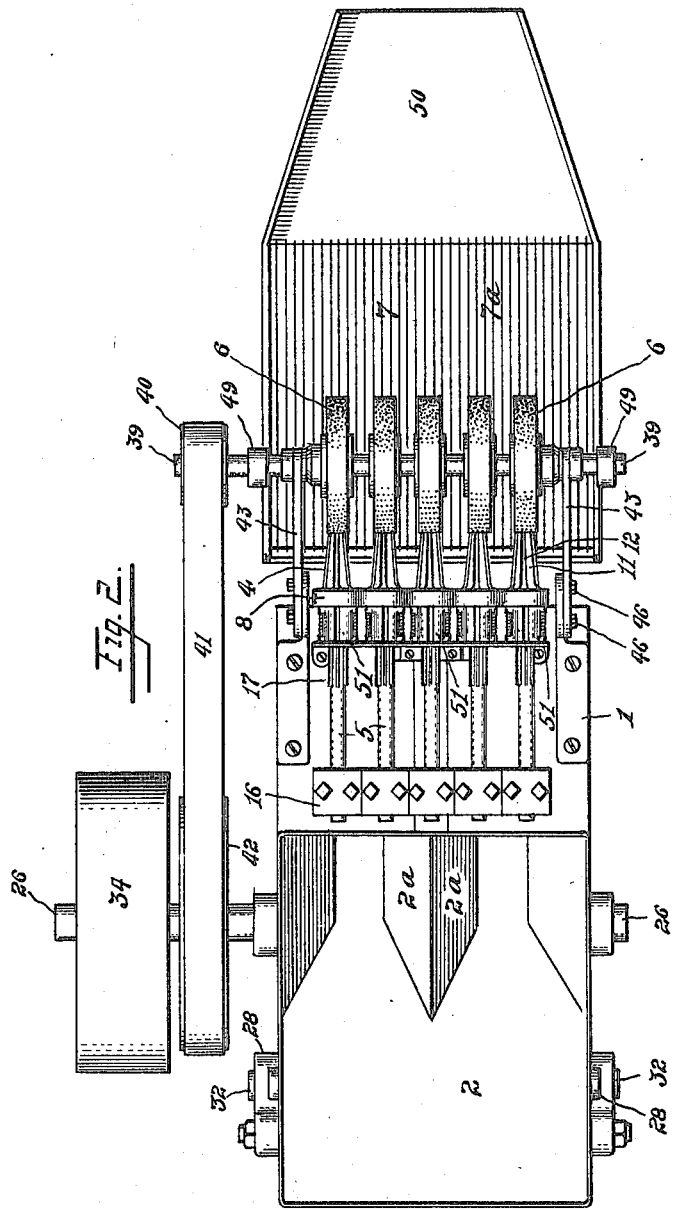

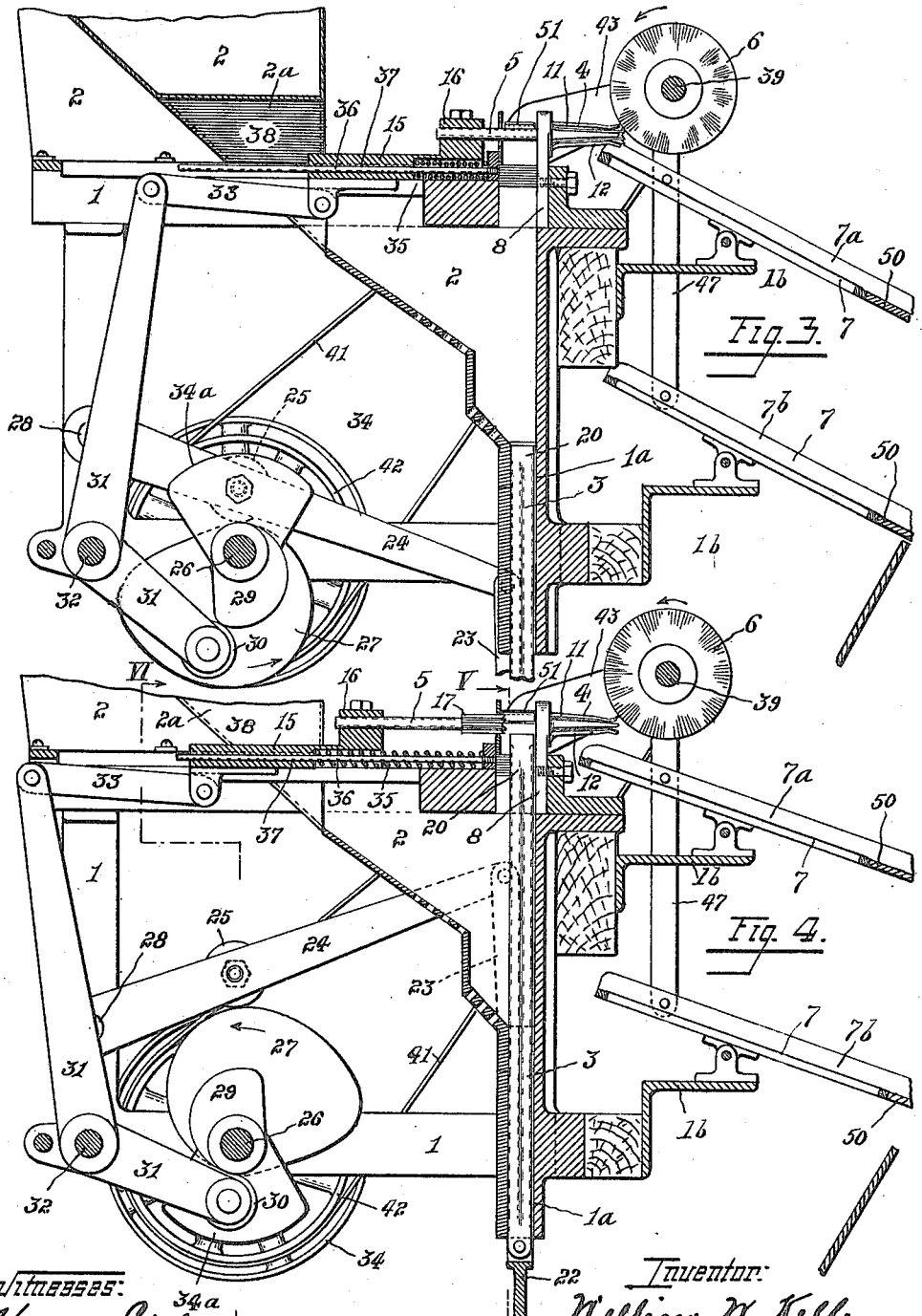

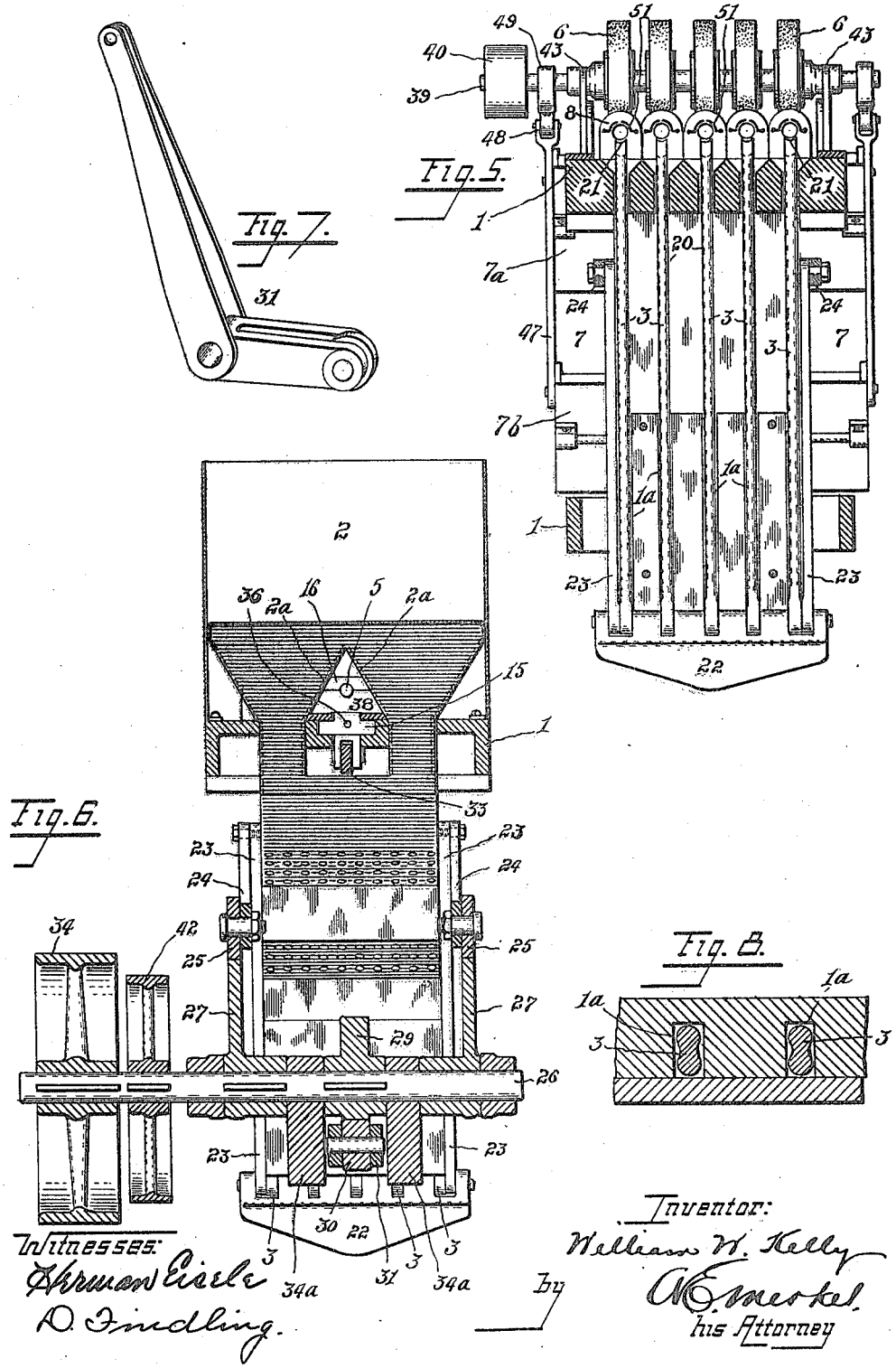

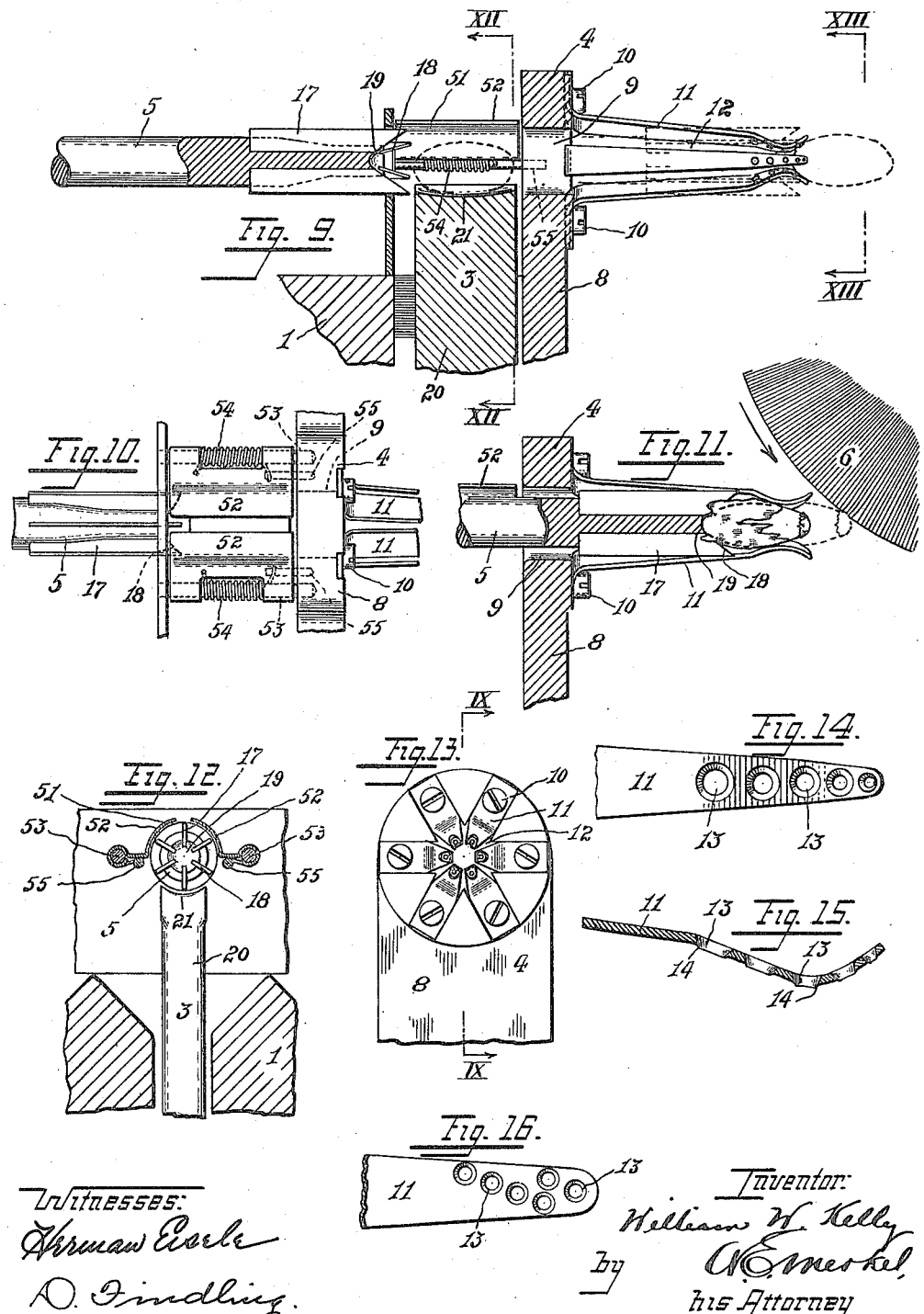

UNITED STATES PATENT OFFICE.

WILLIAM W. KELLY, OF CLEVELAND, OHIO, ASSIGNOR TO THE KELLY COMPANY, A COPARTNERSHIP CONSISTING OF WILLIAM H. KELLY AND LOUIS A. KELLY, OF CLEVELAND, OHIO.

NUT-BLANCHING MACHINE.

1,190,556.     Specification of Letters Patent.     Patented July 11, 1916.

Application filed September 3, 1914. Serial No. 860,079.

*To all whom it may concern:*

Be it known that I, WILLIAM W. KELLY, a citizen of the United States, resident of Cleveland, county of Cuyahoga, and State of Ohio, have invented a new and useful Improvement in Nut-Blanching Machines, of which the following is a specification, the principle of the invention being herein explained and the best mode in which I have contemplated applying that principle, so as to distinguish it from other inventions.

The invention has reference to machines for the treatment of nuts, and especially the kind of nuts known as peanuts, and the object is to remove the outer skin from the nut kernels or decorticate such nut kernels effectively without liability of producing that condition known as "splits."

To this end the machine comprises means for feeding the peanuts, by which term reference is had to the peanut kernels, one at a time to and through a device while traversing which the kernel is subjected to an encircling or embracing pressure by means yieldable to the passage of the peanut kernel, and during such passage the outer skin or cortical is ruptured and removed from the body of the kernel, the result being that the removal of the skin is effected without subjecting the peanut to such forces as to cause a separation of the peanut kernel into its two main component parts.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications come within the scope of the appended claims.

In the drawings:—Figure 1 represents a side elevation of a nut-blanching or decorticating machine embodying my invention. Fig. 2 represents a plan of such machine. Fig. 3 represents a vertical longitudinal section of the machine showing the parts occupying a certain position. Fig. 4 represents a similar vertical longitudinal section showing the parts in a different position. Fig. 5 represents a vertical transverse section taken upon the plane indicated by line V—V in Fig. 4. Fig. 6 represents a vertical transverse section taken upon the planes indicated by line VI—VI in said Fig. 4. Fig. 7 represents a perspective of the levers connecting the driving mechanism with the operating plungers for transferring the kernels to the decorticating devices from the feeding devices. Fig. 8 represents a detail horizontal section, upon an enlarged scale, of one of the feeding plungers and the adjacent guide therefor. Fig. 9 represents, upon an enlarged scale, a detail vertical longitudinal section taken upon the plane indicated by line IX—IX in Fig. 13. Fig. 10 represents, upon a similarly enlarged scale, a detailed plan of one of the guards and adjacent parts for preventing the upward discharge of the nut kernels after having been carried upwardly by the corresponding plungers. Fig. 11 represents, upon a similarly enlarged scale, a detail section similar to that shown in Fig. 9 and illustrating parts shown in said latter figure, with the transferring plunger in a different position. Fig. 12 represents a transverse vertical section, taken upon the plane indicated by line XII—XII in Fig. 9. Fig. 13 represents an end elevation of one of the decorticating devices, as viewed from the plane indicated by line XIII—XIII in Fig. 9 and in the direction indicated by the arrows. Fig. 14 represents in plan a fragmentary portion of one of said decorticating devices. Fig. 15 represents a longitudinal section of the parts shown in Fig. 14. Fig. 16 represents in plan a fragmentary portion of a modified form of such decorticating device.

The seed or kernel of the peanut is a dicotyledon of an irregularly ovocylindrical form having the inner surfaces of the two associated cotyledons approximately flat and in nonadherent contact except that the cotyledons are joined together at the radicle end only by the radicle, while the backs of the cotyledons are more or less convex, said cotyledons forming fleshy lobes.

Peanuts when prepared for eating are cooked by roasting, or by boiling in water or cooking the peanuts in oil, in which last condition the peanuts are known as French fried peanuts. In each case the cooked peanut kernels or seeds are quite hard and the enveloping skin is quite brittle and in the great majority of cases is nonadherent to the cotyledons of which the peanut kernel is composed. The cooking of the peanut kernel makes the junction at the radicle end also quite brittle, but while the enveloping skin remains intact the cotyledons are not easily affected, so as to rupture the radicle structure joining the cotyledons. Still, even a slight force applied to the peanut kernel in a direction to separate or to slide the cotyledons one on the other, and especially in the plane of the contacting faces, is almost certain to shatter the junction at the radicle and cause the complete separation of the cotyledons, thereby producing what are known as "splits," each being composed of about one-half of the whole kernel.

In order to avoid, during the skinning operation, the breaking apart of the cotyledons making up the peanut kernels, the peanuts must be held under compression, but relatively gentle compression, about the longer axis of the kernal and forced straight through the decorticating devices without subjecting the peanut kernel to twisting forces or forces tending to slide one cotyledon on the other in the plane of contact of the cotyledons to an extent sufficient to break the brittle junction at the radicle end. At the same time the decorticating devices must engage the skin in a manner to break the latter and remove it from the kernel without material damage to the surface of the kernel.

The machine of the present invention has been designed especially for the treatment of nuts having the characteristics stated, which characteristics are quite peculiar to peanuts.

In the particular embodiment of the invention illustrated in the drawings there is shown a main frame 1 consisting of suitably arranged longitudinal, upright and transverse elements for supporting the various parts of the machine, the expressions of position both here and throughout the description having to do with the installed machine, which parts in addition to the main frame comprises the following main elements, namely: a hopper 2; a battery of vertically reciprocating plungers 3; a battery of decorticating devices 4, corresponding in number with the plungers 3; a battery of horizontally reciprocating transferring plungers 5, also corresponding in number with the plungers 3; auxiliary or additional decorticating means consisting of a plurality of rotary brushes 6, also corresponding in number with the plungers 3; a screening device 7 for receiving the decorticated kernels after they have been discharged from the decorticating devices, and elements suitably arranged and formed to effect the proper coordination of the above-mentioned main elements; all of the latter supported upon the frame 1.

A plunger 3, a plunger 5, a decorticating device 4 and a brush 6, are all mounted in a single vertical longitudinal plane and with the connecting coördinating elements, in themselves constitute a complete machine embodying my invention, the remaining groups merely forming additional duplicate devices whereby a plurality of kernels may be simultaneously and similarly handled and treated, a single hopper, driving mechanism and screening device serving all of these groups, as will be readily understood. For the purpose of the invention, therefore, it would be necessary to describe but a single of these elements.

Each decorticating device 4 includes a vertical plate 8, suitably fixed to the frame, Figs. 9 to 13 inclusive, and formed with a horizontal cylindrical bore 9. Adjacent to the outer end of this bore 9 and fixedly secured by means of screws 10 to the contiguous portion of the plate 8, is a plurality of fingers 11 whose outer ends are free. These fingers are each made of spring steel, whereby they are rendered highly elastic, are tapered and converge outwardly to a vertical transverse plane, intersecting the fingers near the outer ends thereof, from which plane they again incline and diverge for a short distance. Said fingers are all of like dimensions, are arranged in a circular series and are separated from each other equidistantly, thus forming slots 12 which extend to the extremities of said fingers. They, therefore, together with the bore 9, form the walls of a duct through which, as will be hereinafter described, the nut-kernels are caused to pass.

The outer end portion of the converging part of each finger, together with the diverging extreme end-portion thereof is formed with a plurality of inwardly projecting protuberances or teeth forming decorticating elements. In the particular device illustrated, these protuberances are formed by drilling conical holes 13, by means of a suitable tool which, upon completion of the drilling operation, will leave an inwardly projecting circular bur 14, as clearly shown in Fig. 15, such burs forming the described inwardly projecting protuberances or decorticating edges. These conical holes, and hence protuberances or decorticating elements, lie in successive planes transverse with respect to the axis of the duct, a group of such elements lying in each plane, the members of each group being arranged about the said axis. It will furthermore be noted that a plurality of these decorticating elements lie in each of a plurality of planes containing the axis of said duct.

The diameter of the bore 9 is such as to readily permit the passage therethrough of a peanut kernel which has been placed in alinement therewith, with its major axis coinciding with the axis of the duct, and the left-hand portion of the yielding part of the duct formed by the fingers 11 is made also sufficiently large for the same purpose. The outer or contracted end-portion of the duct is of a diameter such that it will be necessary to spring the fingers outwardly in order to permit of the passage of such kernel therethrough.

Each of such described decorticating devices has operating in connection therewith one of the plungers 5, the latter being mounted with its axis coinciding with the axial line of the described duct. The entire group of plungers 5 is secured to a common cross-head 15, Figs. 1, 2 and 3, the left end of such plungers being secured to the cross-head by means of removable screw-held caps 16. This cross-head is caused to reciprocate and each plunger caused to pass into and out of the duct, the left-hand extreme position of such plunger being shown in full lines in Fig. 9 and the right-hand extreme position in dotted lines in the same figure. The right-hand end of each plunger is slotted and has secured in such slots, radially extending plates 17 equidistant from each other circumferentially and equal in number to and alined with the slots 12. The right-hand ends of these plates are beveled inwardly to form a seat 18 for receiving one end of a peanut kernel, the extreme end of the plunger proper being hollowed out as at 19 to complete the conical seat so formed.

Operating in the vertical plane containing the axes of the plunger 5 and the decorticating duct, is a vertically reciprocating plunger 20, one for each plunger 5, the upper end of which is formed with a groove 21 having its axis lying in said plane and elongated in the direction thereof. The form of this groove is such that it will receive and loosely hold with the required security, a peanut kernel lying therein with its longer axis parallel with the axis of the groove, as shown in dotted lines in Fig. 9. As shown, each of these plungers 20 is located below the space lying intermediately of the bore 9 and the end of the plunger 5 when the latter is in its extreme left-hand position, as also shown in said Fig. 9.

The device as thus far described operates as follows:—When the plunger 5 is in its left hand position, indicated in Fig. 9, the plunger 20 is in its uppermost position with the lowermost ones of the plates 17 in line with the slot 21 and the bottom of said slot in line with the bottom of the bore 9 opening into the decorticating duct formed by the circular series of fingers 11. Assuming that a peanut kernel is lodged on the plunger 20 in the groove 21 and has been elevated with the plunger to the position shown in Fig. 9, the peanut kernel being there indicated in dotted lines, a forward movement of the plunger, that is a movement toward the right in the showing of Fig. 9, causes the seat 18 in the end of the plunger to receive and engage the corresponding end of the nut kernel. A further progressive movement of the plunger toward the right forces the kernel through the bore 9 and into the decorticating duct where the ends of the fingers 11 remote from the bore 9 approach and hence the nut becomes centered in the duct, being engaged circumferentially at as many points as there are fingers 11. A still further progressive movement of the plunger forces the nut kernel along the duct with the fingers 11 yielding outwardly to the nut and thereby exerting a compressive force thereon whereby the nut kernel is now within what may be termed a compression zone. Ultimately that end of the nut remote from the plunger is brought into engagement with the first of the series of decorticating protuberances or edges 14 which engage the skin and break it, and, as the progress of the nut continues, strip the skin from the nut, this being aided by others of the proturberances subsequently engaging the nut. Finally the nut having been forced through that portion of the duct where the fingers approach closely emerges therefrom and is acted upon by the extremities of the fingers where they recede one from the other, the spring of the fingers causing them to closely hug the nut at that end engaged by the plunger so that the decorticating protuberances 14 located near the extremities of the fingers act upon those portions of the skin which inclose the rear end of the nut in the order of travel through the decorticating device. This causes the removal of any of the skin which for one reason or another might otherwise cling to what may be termed the rear end of the nut. During the travel of the nut through the decorticating duct it is followed up by the plunger, this being permitted since the blades 17 of the plunger then travel in the slots 12 between the fingers 11, so that no resistance is offered to the close conformation of the fingers to the surface of the nut and the adaptation of the fingers to changes in shape of the nut kernel. While such nut kernel is generally ovocylindrical, the surfaces of peanut kernels are often very irregularly shaped and hence quite a number of fingers 11 are employed in the circular series, practice having demonstrated that six such fingers are sufficient and efficient, besides providing a sufficient number of points of contact with the nut to produce an encircling compression zone.

The degree of pressure exerted by the fingers upon the nut is gaged so that the cotyledons are held firmly together without, however, the pressure being materially injurious to the surface of the nut and the travel of the nut is straight through the decorticating duct without liability or even chance of twisting movements such as would be liable to break the weak and brittle junction afforded by the connecting structure at the radicle end of the kernel. During the skinning operation the breaking of the skin removes from the nut such protection against twisting or sliding forces as may be afforded by the skin. It becomes of importance, therefore, that the passage of the nut through the decorticating device shall be straight through the latter in line with the longer axis of the nut and without twisting or turning movements of the kernel, while during such passage the kernel is within a zone of gentle compression exerted all about the nut in substantially equal degrees, the compressing means yielding to the passage of the nut without release of the compression and said compressing forces being gaged to avoid material harm to the surface of the nut.

The uniformly exerted compression about the nut in the compression zone in a direction transverse to the longer axis of the kernel completely avoids any tendency or liability to destroy the normal relation of the cotyledons, and, therefore, the number of splits produced in the commercial operation of the machine is practically negligible, being relatively very few. Immediately after the kernel is discharged, the elastic fingers 11 reassume their normal positions, ready for the next operation. The plunger 5 is then immediately withdrawn, the plunger 20 having, in the meantime, been lowered to receive another kernel.

The lower ends of the plungers 3 are mounted in guideways 1ª, Figs. 4 and 5, and a common cross-head 22 is provided with which the lower extremity of each of these plungers articulates. This cross-head articulates with the lower ends of two laterally placed connecting rods 23, Figs. 1 and 5 and the upper end of each such connecting rod articulates with one of two levers 24, each of which carries an antifriction roller 25.

A main driving shaft 26 is transversely mounted in the frame of the machine and carries two cams 27, 27, fixed thereto. These cams engage the rollers 25 respectively. The levers 24 are suitably pivoted to the frame of the machine as at 28. The rotation of the shaft 26 therefore will effect the reciprocation of the levers 24, the links 23, the cross-head 22 and hence the plungers 3.

Centrally of the machine and fixedly secured to the main driving shaft 26 is a cam 29 which engages an antifriction roller 30 fixed to one arm of a bell-crank 31 which is pivotally mounted upon a rod 32 suitably secured upon the frame of the machine. The other arm of this bell-crank articulates with one end of a link 33 whose other end articulates with the cross-head 15, upon which the plungers 5 are mounted, as previously described. This cross-head is mounted in a suitable slideway formed in the frame. A suitable driving pulley 34 is secured to a projecting end of the driving shaft 26.

The cams 27 and 29 are so arranged that they will produce the relative movement of the plungers 3 and 5 previously described, the one extreme position of the plungers 3 being illustrated in Fig. 3, in which position the nut kernel has just been discharged from the decorticating device, and the other extreme position being illustrated in Fig. 4, in which the parts are in a position preparatory to transferring the nut kernel from the plungers 3 to the decorticating duct, as also previously described.

Suitable counterweights 34ª are provided and fixed to the main driving shaft 26 to provide the required continuity of motion. The weight of the plungers 3 and connected parts maintains the contact between the rollers 25 and cams 27. Contact between the cam 29 and roller 30 is maintained by means of a coil spring 35 which surrounds a fixed horizontal rod 36 having its end suitably fixed and extending through a centrally located bore 37 formed in the cross-head 15, an enlargement of this bore being provided for receiving said spring.

The guide-ways 1ª for the plungers 3 terminate at the extreme lower end of the bottom of the hopper 2, such bottom inclining downwardly from the left to the right of the machine. The upper portion of this hopper is divided centrally by means of walls 2ª converging upwardly and forming a space 38 through which that part of the frame 1 extends upon which is formed the guide-way for the cross-head 15. The nuts are fed into the hopper 2 and dropped down on both sides of these walls 2 into the lower portion of the hopper and upon the upper ends of the plungers 3 when the latter are in their lowermost position. The upward movement of these plungers therefore causes their upper ends to catch and hold a nut kernel, the form of the groove 21 being such as to cause such kernel to assume a position in which its major axis is, as required, parallel with the axis of the decorticating duct.

It sometimes happens that the skin adheres quite tenaciously to the surface of the kernels, wherefore that portion of the skin capping the end of the kernel first presented to the decorticating devices is not removed, since the spring fingers necessarily have some width at their outer ends in order to provide for the flare of these fingers at their extremities and cannot be brought close enough together to engage the extremity of that end of the kernel first presented to the decorticating device. To insure the removal of such adhering portion, I provide additional means for removing same. These means consist of the plurality of previous mentioned brushes 6, one being provided for each decorticating duct. These brushes are all mounted upon a common shaft 39, Fig. 2, upon which is secured a pulley 40 which is driven by a belt 41 running over a driving pulley 42 and secured to the main driving shaft 26. As shown in Fig. 11, these brushes are so located that the extreme right-hand end of the kernels strike the periphery of same upon their emergence from the decorticating duct. The consequent contact of this remaining portion of the cortical with such rotating periphery will effect its removal.

The shaft 39 is mounted in the outer ends of two laterally placed arms 43 which are adjustably mounted upon a rod 44 secured upon the frame 1 of the machine, as shown in Fig. 1. A convenient method of securing the adjustability is the provision of slots 45 in these arms through which pass suitable bolts 46 threaded into the adjacent portion of the frame, as will be readily understood.

Below the outer ends of the decorticating ducts, and the brushes 6, is the screening device 7 previously referred to. This device consists of an upper screen 7$^a$ and a lower screen 7$^b$. Each of these screens is oscillatorily mounted upon suitable brackets 1$^b$, 1$^b$, Fig. 1, and are connected to each other by means of two connecting bars 47 which articulate with the sides of said screen respectively and each carrying at its upper end an anti-friction roller 48. These rollers engage cams 49 respectively, fixedly mounted upon the shaft 39. The rotation of the latter therefore oscillates these screens simultaneously. The lower ends of the latter are formed into chutes 50 as shown in Fig. 2. The mesh of the upper screen is made coarser than that of the lower screen and of a size such as to allow the splits as well as the removed skins to pass therethrough. The mesh of the lower screen is made such as to retain the splits, the construction being such that the whole kernels may be received from the end of the upper screen and the split kernels from the end of the lower screen.

In order to prevent the upward discharge of a kernel from the plungers 20 when the latter come to a stop at the upper ends of their strokes, I provide shields 51, Figs. 9 and 10, immediately above each such plunger 20. These shields consist of two leaves 52 pivotally mounted upon pins 53 and normally held in a substantially horizontal position by means of coil-springs 54, one end of each of which is secured to one of the leaves and the other to a fixed pin 55. The two leaves of each shield therefore may yield upwardly, the downward movement being limited by means of the pins 55. This yielding arrangement is provided in order that in the event that two kernels should inadvertently be carried upwardly by a plunger 21, the uppermost would strike the yielding shield, the latter would give way and thus prevent the destruction of the kernel.

Instead of placing the decorticating elements of each finger 11 so as to lie in a single plane containing the axis of the decorticating duct, they may be placed in echelon, as illustrated in Fig. 16, this latter arrangement permitting a larger number of decorticating elements to be placed upon each finger.

In order to prevent the chaff derived from the operation of this process and which is deposited in the bottom of the hopper, from interfering with the bearing of the vertically reciprocating plungers 3, I provide the peculiar construction of these plungers and their bearings, illustrated in Fig. 8. As illustrated therein the guide-ways for these plungers are each made rectangular in cross-section and the plungers themselves have the peculiar cross-section illustrated, in which the ends of such are rounded and the middle longitudinal portion is concave, giving six points of contact between the surfaces of the guide-ways and the surfaces of the plungers. The dimensions of the latter are also made slightly less than the interior dimensions of the guide-ways so that the plungers fit loosely therein. This construction leaves a sufficient amount of free space between the plungers and their guides to prevent the chaff from jamming the same and thus interfering with their operation.

By means of the above-described apparatus I am therefore enabled to effect the decortication of peanut kernels at a very greatly increased speed, as compared with the hand operation heretofore employed, as well as under more sanitary conditions, and with an attendant production of a larger proportion of whole kernels. This permits me to provide the trade, in consequence, with a superior product both as to the form of the nut kernel as well as to the sanitary condition thereof and at a lower price than has heretofore been possible.

Having fully described my invention, what I claim and desire to secure by Letters Patent is:—

1. In a peanut decorticating machine, means for causing the peanut kernels to travel progressively without rotative movement each in the direction of its longer axis, expansively yieldable compressing means in the path of the traveling kernels for producing a zone of compressive forces of a degree harmless to the exterior portions and adapted to prevent relative displacement of the peanut cotyledons, and skin holding and rupturing means for engaging the enveloping skin of and stripping it from a traveling peanut while the latter is subjected to the compressive forces.

2. A machine for decorticating cooked peanuts, comprising means for causing the peanut kernels with the skins thereon to travel progressively each in the direction of its longer axis, expansively yieldable means of rigid material for applying yielding pressure to each peanut kernel while progressively traveling with said pressure in surrounding or enveloping relation to the kernel and gaged to hold the cotyledons of the peanut kernel together against separation or displacement movements, and abrasive means located with relation to the expansively yieldable means to hold and break the skin and thereby cause it to be stripped from the traveling peanut while the latter is being subjected to the expansively yieldable pressure applying means.

3. A decorticating machine for cooked peanuts having means for causing the peanut kernels with the skins thereon to travel progressively each in a direction lengthwise of its longer axis, and a plurality of decorticating means in surrounding relation to the path of travel of the peanut kernels, said decorticating means being normally spaced apart by a distance less than the shorter diameter of a peanut kernel and elastically yieldable to the passage of the kernels, the pressure exerted by the decorticating means upon the peanuts being gaged to yield to the passage of the peanut kernels and at the same time exert a compressive action thereon sufficient to prevent breakage of the radicle ends of the peanut kernels and to break and remove the enveloping skin of the peanut kernels.

4. A peanut decorticating machine having decorticating means provided with a plurality of elastically and expansively yieldable pressure applying members together defining an elongated passage of normally less diameter than the shorter diameter of a peanut kernel, and means for causing the peanut kernels to travel progressively through the passage defined by the pressure applying means each in a direction lengthwise of its longer axis, said pressure applying means being gaged to exert a pressure sufficient to hold the peanut cotyledons from displacement one relative to the other and to break and remove the skin from the peanut kernels without harm to the fleshy exterior of such kernels.

5. In a peanut decorticating machine, a decorticating device constructed to exert an expansively yieldable compressing force on a peanut traveling therethrough to a degree harmless to the exterior portion of the peanut cotyledons, and said device having means for holding the skin of the peanut to strip it therefrom while the peanut is being forced through such device, means for presenting the peanuts successively into position to be forced through the decorticating device with the longitudinal axis of the peanuts in the line of travel through such decorticating device, and means for causing the peanuts to travel progressively, without rotative movement, each in the direction of its longer axis through said decorticating device.

6. A peanut decorticating machine provided with decorticating devices including means for the production of an elongated and outwardly yieldable compression zone in encircling relation to the path of the peanuts in advance of and through which the peanuts travel to the decorticating devices with the pressure gaged to hold the peanut cotyledons together against distortive forces during the removal of the skin, whereby the skin is removed from the peanuts without breaking the structure joining the peanut cotyledons.

7. A peanut decorticating machine provided with a duct through which the peanuts are movable in the direction of their longer axes, said duct tapering from the entrance toward the exit end and provided with walls elastically yieldable to the passage of a peanut to exert a compressive force upon the peanut uniformly thereabout, and said decorticating machine having decorticating means related to the exit end of the duct to engage and hold the skin of the peanut to strip said skin from the peanut kernel while the latter is moving therethrough and while it is subjected to the compressive force.

8. In a nut blanching machine, a tubular structure through which a nut kernel is adapted to pass and provided with inwardly projecting portions having transversely extending decorticating edges located intermediately of the extremities of said structure, and means for propelling the nut kernel lengthwise through the tubular structure.

9. In a nut blanching machine, a tubular structure through which a nut kernel is adapted to pass, and having yielding walls, the latter being provided with inwardly projecting portions having transversely extending decorticating edges located intermediately of the extremities of such structure, and means for propelling the nut kernel lengthwise through the tubular structure.

10. In a nut blanching machine, an elongated tubular structure through which a nut kernel is adapted to pass and having its entrance end of greater diameter than its discharge end, and expansively yieldable at said discharge end, said structure being provided with inwardly projecting portions having transversely extending decorticating edges located intermediately of the extremities thereof where the tubular structure is expansively yieldable.

11. In a nut blanching machine, a tubular structure through which a nut kernel is adapted to pass with the entrance end of said structure of greater diameter than its discharge end and said discharge end being expansively yieldable, said structure furthermore having the yielding portions of its walls provided with inwardly projecting portions having transversely extending decorticating edges located intermediately of the extremities thereof.

12. In a nut blanching machine, the combination with a plurality of decorticating elements lying in successively occurring planes, each element including a transversely extending decorticating edge, of means for moving a nut kernel and said decorticating elements relatively to each other and in a direction transverse with respect to said planes.

13. In a nut blanching machine, a decorticating device comprising a tubular duct having for its walls a plurality of fingers each having one end free and terminating at one extremity of the duct, and fixed at the other end and also provided with inwardly projecting protuberances having transversely extending decorticating edges.

14. In a nut blanching machine, a decorticating device comprising a tapered tubular duct having yielding walls and inwardly projecting protuberances carried by said walls, each of said protuberances being provided with a transversely extending decorticating edge.

15. In a nut blanching machine, the combination of a decorticating device comprising a tapered tubular duct with decorticating means at the smaller end, means for placing a nut kernel in position opposite that end of the duct of major diameter with the major axis of the kernel extending in the direction of the axis of the duct, and means for moving the kernel through the duct and discharging it from the smaller end of said duct.

16. In a nut blanching machine, a decorticating device comprising a tubular duct having a bore converging from both extremities toward a plane intersecting said duct intermediately of such extremities and provided with decorticating means at the junction of said converging portions of the duct.

17. In a nut blanching machine, a decorticating device comprising a tubular duct converging from both extremities toward a plane intersecting such duct intermediately of the extremities with the interior of both the converging portions provided with decorticating edges.

18. In a nut blanching machine, a decorticating device consisting of a tubular duct having its walls provided with circular perforations surrounded at their intersections with the inner surface of said duct by circular decorticating edges.

19. In a nut blanching machine, the combination of a decorticating device, means for causing nut kernels to travel through and in operative relation with said device, and a rotary decorticating device and there having its movement corresponding to the direction of travel of the nut kernels in proximity to the discharge end of said first-named decorticating device.

20. In a nut blanching machine, the combination of a decorticating device, means for bringing nut kernels into operative relation with and discharging them from said device, and a rotary brush in juxtaposition to and above the discharge end of said device to permit the lower surface of the brush to engage the kernels as they are discharged from the decorticating device.

21. In a nut blanching machine, the combination of a receptacle for containing nut kernels, a tubular decorticator in proximity thereto, and a vertically reciprocable plunger having its path of movement intersecting the interior of the receptacle and the axis of the decorticator, said plunger being provided at its upper extremity with an elongated groove having its axis parallel with the axis of the decorticator.

22. In a nut blanching machine, the combination of a vertically reciprocable feeding plunger, a decorticating device, means operating in line with the decorticating device for transmitting a nut kernel from the plunger to said decorticating device, and a shield located above said plunger for preventing the inadvertent discharge of a kernel from said plunger.

23. In a nut blanching machine, the combination of a vertically reciprocable feeding plunger, a decorticating device, means operating in line with the decorticating device for transmitting a nut kernel from the plunger to said decorticating device, and a shield located above said plunger for preventing the inadvertent discharge of a kernel from said plunger, said shield being yieldable in the direction of travel of the plunger toward it.

24. In a nut blanching machine, the combination of a vertically reciprocable feeding plunger, a decorticating device, means operable in line with the decorticating device for transmitting a nut kernel from the plunger to said decorticating device, and a yieldable two-part shield located above the plunger for preventing the inadvertent discharge of a kernel from said plunger.

25. In a peanut blanching machine, a decorticating device through which peanuts are caused to travel in the direction of their length, comprising a metallic tubular structure having a yieldable portion of smaller interior diameter than a peanut kernel to yieldably engage the latter and provided with teeth in position to yieldably engage and hold the skin of the peanut kernel when the latter is passing through the decorticating device and while subjected to the yieldable pressure of the tubular structure, and means for propelling the peanut through the tubular structure.

26. In a peanut blanching machine, a decorticating device including a tubular structure having a yieldable portion of smaller interior diameter than a peanut kernel, means for forcing the peanut kernel lengthwise through the tubular structure, and decorticating means located with respect to that portion of the tubular structure of smaller diameter to engage the peanut kernel for the removal of the skin therefrom while still engaged by that portion of the duct of smaller diameter.

27. In a peanut decorticating machine, the combination with a hopper, of a decorticating device, a reciprocatory plunger movable through the decorticating device to an extent to force peanuts therethrough in the direction of the length of the peanuts, and reciprocatory means movable through the hopper to present peanuts one at a time in the line of travel of the plunger.

28. In a peanut decorticating machine, the combination of feeding means for the peanuts comprising a hopper and means movable therethrough for engaging the peanuts one at a time, a decorticating device provided with a reciprocatory plunger for forcing the peanuts therethrough one at a time in the direction of its length, and driving mechanism for the means movable through the hopper and for the plunger timed to cause the presentation of one peanut at a time into position for each reciprocation of the plunger.

29. In a peanut decorticating machine, a decorticating device having a circular series of fingers circumferentially spaced apart and a plunger for forcing the peanuts through the decorticating device interior to the series of fingers, said plunger having the peanut engaging end in the form of a circular series of longitudinally arranged blades spaced apart in conformity with the spacing of the fingers and each of a width to enter and travel along a corresponding space between two adjacent fingers.

30. In a peanut decorticating machine, a decorticating device having a peanut receiving duct comprising a circular series of fingers spaced apart circumferentially and defining a duct of a size at one end to receive a peanut and approaching at the other end to an internal diameter less than the diameter of a peanut, said spring fingers tapering toward the smaller end of the duct and there elastically yieldable to the passage of a peanut, and a plunger movable lengthwise of the duct and comprising a circular series of longitudinally arranged blades spaced apart to enter between the fingers in the spaces separating said fingers.

31. In a peanut decorticating machine, a decorticating device provided with decorticating means and a circular series of spring fingers leading to and tapering toward the decorticating means with the fingers spaced apart circumferentially and defining a tapering duct for peanuts, and a plunger for propelling the peanuts through the duct having the peanut engaging end comprising a circular series of blades spaced apart in conformity with the spaces between the fingers to enter said spaces when a peanut engaged by the plunger is moved through the duct to the decorticating means.

32. In a peanut decorticating machine, a decorticating device having spaced elements for engaging a peanut moving therethrough, and a plunger for propelling the peanut through said decorticating device, said plunger being provided with spaced peanut-engaging elements movable in the spaces between the first-named spaced elements.

33. In a peanut decorticating machine, a decorticating device having spaced elements defining a duct and also provided with decorticating means spaced similarly to the spaced elements and said spaced elements and decorticating means being yieldable to the passage of a peanut therethrough, and a peanut propelling plunger movable through the decorticating device and provided with fixed elements positioned and adapted to move through the spaces between the first-named elements and the spaces between the decorticating means.

Signed by me, this 27th day of August, 1914.

WILLIAM W. KELLY.

Attested by:
HERMAN ESELE,
D. FINDLING.

Copies of this patent may be obtained for five cents each, by addressing the "Commissioner of Patents, Washington, D. C."